(12) United States Patent
Thompson et al.

(10) Patent No.: US 10,379,982 B2
(45) Date of Patent: Aug. 13, 2019

(54) COMPUTER SYSTEM AND METHOD FOR PERFORMING A VIRTUAL LOAD TEST

(71) Applicant: Uptake Technologies, Inc., Chicago, IL (US)

(72) Inventors: Timothy Thompson, Chicago, IL (US); Joseph Becker, Chicago, IL (US); Praveen Salitra, Naperville, IL (US)

(73) Assignee: Uptake Technologies, Inc., Chicago, IL (US)

( * ) Notice: Subject to any disclaimer, the term of this patent is extended or adjusted under 35 U.S.C. 154(b) by 61 days.

(21) Appl. No.: 15/799,802

(22) Filed: Oct. 31, 2017

(65) Prior Publication Data

US 2019/0129820 A1 May 2, 2019

(51) Int. Cl.
*G06F 11/00* (2006.01)
*G06F 11/22* (2006.01)
*G06F 11/36* (2006.01)

(52) U.S. Cl.
CPC ...... *G06F 11/2294* (2013.01); *G06F 11/2268* (2013.01); *G06F 11/3664* (2013.01); *G06F 11/3688* (2013.01)

(58) Field of Classification Search
CPC .................................. G06F 11/00; G06F 11/22
USPC .......................................................... 714/25
See application file for complete search history.

(56) References Cited

U.S. PATENT DOCUMENTS

| | | |
|---|---|---|
| 4,825,167 A | 4/1989 | Bayba |
| 5,566,092 A | 10/1996 | Wang et al. |
| 5,633,800 A | 5/1997 | Bankert et al. |
| 5,969,601 A | 10/1999 | Sato et al. |
| 6,256,594 B1 | 7/2001 | Yamamoto et al. |

(Continued)

FOREIGN PATENT DOCUMENTS

| | | |
|---|---|---|
| WO | 2007028011 | 3/2007 |
| WO | 2011117570 | 9/2011 |

(Continued)

OTHER PUBLICATIONS

Biswas, "Redundancy-based Approaches in Wireless Multihop Network Design", PhD Dissertation Submitted to Graduate Faculty of North Carolina State University (2014).

(Continued)

*Primary Examiner* — Sarai E Butler
(74) *Attorney, Agent, or Firm* — Lee Sullivan Shea & Smith LLP

(57) ABSTRACT

Computing systems, devices, and methods for performing a virtual load test are disclosed herein. In accordance with the present disclosure, an asset data platform may define a respective range of acceptable values for each load-test variable in a set of load-test variables. The asset data platform may then receive one or more under-load reports from a given asset, and carry out a virtual load test for the given asset by, performing a comparison between the respective observation value for the load-test variable included in the most recent under-load report and the respective range of acceptable values for the load-test variable. In turn, the asset data platform may identify load-test variables for which the respective observation value falls outside of the respective range of acceptable values, and may then cause a client station to present results of the virtual load test for the given asset.

20 Claims, 7 Drawing Sheets

(56) References Cited

U.S. PATENT DOCUMENTS

| | | |
|---|---|---|
| 6,318,160 B1 | 11/2001 | Bessler |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,799,213 B1 * | 9/2004 | Zhao .................. H04L 43/50 709/224 |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,731,977 B1 | 5/2014 | Hardin et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 2002/0091972 A1 | 7/2002 | Harris et al. |
| 2002/0143443 A1 | 10/2002 | Betters et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0194097 A1 | 8/2007 | Jones et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0289561 A1 * | 9/2014 | Majumdar ............ G06F 11/263 714/32 |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0089292 A1 * | 3/2015 | Ueda .................... G06F 11/263 714/33 |
| 2015/0262060 A1 | 9/2015 | Husain et al. |
| 2016/0155315 A1 | 6/2016 | McElhinney et al. |

FOREIGN PATENT DOCUMENTS

| | | |
|---|---|---|
| WO | 2013034420 | 3/2013 |
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

(56) References Cited

OTHER PUBLICATIONS

Waltermire et al, Applying the Continuous Monitoring Technical Reference Model to the Asset, Configuration, and Vulnerability Management Domains (Draft), NIST (Jan. 2012).
International Searching Authority, International Search Report and Written Opinion dated Feb. 22, 2019, issued in connection with International Application No. PCT/US2018/058264, filed on Oct. 30, 2018, 14 pages.

* cited by examiner

Load Test

Asset    Model    Date Generated

Asset A    Model B    2017-mm-dd 23:30:15 (+00:00)

FLAG some signals are out of the acceptable range

[Save Test]    [Export]

| Signal Name | Description | Units | Value | High | Low |
|---|---|---|---|---|---|
| Signal A | Description A | N/A | -2.99 | -1 | -10 |
| Signal B | Description B | PSIG | 40.25 | 45 | 39 |
| Signal C | Description C | °F | 92.4 | 104 | 83 |
| Signal D | Description D | RPM | 939 | 947 | 930 |
| Signal E | Description E | kW | 3200 | 3330 | 2900 |
| Signal F | Description F | A | 84 → | 98 | 85 |
| Signal G | Description G | V | 2200 | 2300 | 2100 |
| Signal H | Description H | °F | 172 | 200 | 140 |
| Signal I | Description I | PSIG | 75 ← | 70 | 55 |
| Signal J | Description J | V | 230 | 240 | 220 |

COMPUTER SYSTEM AND METHOD FOR PERFORMING A VIRTUAL LOAD TEST

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary. For instance, some assets include multiple subsystems that must operate in harmony for the asset to function properly (e.g., an engine, transmission, etc.).

Because of the increasing role that assets play, it is also becoming increasingly desirable to manage and maintain assets in operation. Unexpected failures of any given subsystem of an asset can have negative consequences such as disruptions in schedules and increased costs to take countermeasures. However, managing and maintaining assets efficiently can be both time-consuming and expensive as well. Some have periodically conducted diagnostic examinations, such as load tests, at a repair shop to ensure that a given asset can perform as intended under certain load conditions.

For example, the current approach to load testing generally involves removing an asset from the field and bringing it into a repair shop (or the like), having a human technician at the repair shop connect the asset to diagnostic tools and measure the operation of the asset while subjecting it to certain simulated load conditions, and then having the human technician at the repair shop review and evaluate the resulting measurements to determine whether the asset has passed or failed the load test. This type of load test is often referred to as an "inbound load test."

Once the asset has been brought into the repair shop, a human technician may then perform various other tests and/or repairs on the asset before sending the asset back out into the field. Once these tests and/or repairs have been completed and the asset is ready to be released from the shop, a second load test may be conducted before it leaves the repair shop to verify that the asset will operate as intended under certain load conditions. This type of load test is often referred to as an "outbound load test."

OVERVIEW

While the current approach of load testing assets at a repair shop (or the like) generally enables evaluation of whether the assets will operate as intended under certain load conditions, it has a number of drawbacks. For instance, a conventional load test at a repair shop may add additional strain to an asset being tested under certain load conditions, and may add fuel costs and emissions in conducting the test. Moreover, a conventional load test at a repair shop may add unnecessary labor costs from human technicians conducting the test and evaluating the results, while adding costly downtime for the asset. Further, a conventional load test at a repair shop is generally limited to simulating load conditions that an asset may experience in the real world, and in some instances, it may be impractical to simulate load conditions that arise while an asset is actually in motion. Further yet, the current approach of load testing assets at a repair shop typically involves human technicians capturing and evaluating the results of the load tests, which is prone to inaccuracies due the variability from technician to technician and the realities of human error.

To help address one or more of these issues, disclosed herein are example systems, devices, and methods for conducting a virtual load test during operation of an asset in the field to determine whether the asset is operating as intended under certain load conditions. Because the disclosed virtual load test is conducted during operation of an asset in the field while it is experiencing real-world load conditions, it may help overcome the downsides of bringing an asset to a repair shop to conduct a load test under simulated load conditions.

According to the present disclosure, an asset data platform may be configured to receive operating data from a plurality of assets in the field, each of which may be equipped with various sensors and/or actuators distributed throughout the asset that monitor the operating conditions of the asset. As one representative example, an asset may be a locomotive, and the sensors and/or actuators may monitor parameters such as temperatures, pressures, fluid levels, voltages, and/or speeds, among many other examples. Additionally, the asset may be configured to transmit a given type of operating data report to an asset data platform, which may be referred to herein as an "under-load report."

The asset may transmit an under-load report at various instances. In one instance, the asset may transmit the under-load report to the asset data platform when the asset is operating in accordance with a given set of load conditions. Such an under-load report may be referred to herein as an "asset-triggered under-load report." The given set of load conditions may take various forms. As one example, the given set of load conditions may include a threshold speed (e.g., 20 MPH) and a requirement that an asset be in full throttle. Other examples are possible as well.

In another instance, the asset may transmit the under-load report to the asset data platform in response to operator input. For example, an operator at the asset (or at a remote location) may activate one or more controls to cause the asset to send an under-load report to the asset data platform. Such an underload report may be referred to herein as a "user-triggered under-load report."

In practice, the operator may activate one or more controls at a given time to cause the asset to send a user-triggered under-load report to the asset data platform. The one or more controls may include, for example, a mechanical control, or a control in a software application running on a client station that is in communication with the asset. Other examples are possible as well. In one implementation, the operator may activate the one or more controls while the asset is at a repair shop to ensure that the asset will operate as intended under certain load conditions before it leaves the repair shop (e.g., at a time that a human technician would typically conduct a conventional load test). In another implementation, the operator may activate the one or more controls if the operator believes there is an issue with the asset while operating in the field.

Further, the under-load report (e.g., user-triggered under-load report or asset-triggered under-load report) transmitted by an asset may take various forms. At a high level, each under-load report may include values for a given set of operating data variables that are of interest for a load test, such as a snapshot of the most-recent measurements from a given set of sensors and/or actuators at the asset. This given set of operating data variables may be referred to herein as the "load-test variables."

The set of load-test variables may include standard diagnostic variables for the asset, such as horsepower, RPM, fuel level, voltage, current, coolant pressure, as examples, as well as other "in-motion" variables for which values are generally only available when the asset is in motion, such as traction motor RPMs as an example. Notably, these in-motion variables are typically not available when a load test is performed at a repair shop under simulated load conditions. The set of load-test variables may also include other variables that may be of interest for a load test as well. For example, the set of load-test variables may also include external weather data measured by the asset, such as ambient temperature, air pressure, among other examples, which may be influencing measurements taken at the asset. As another example, the set of load-test variables in an under-load report may include additional variables that provide a snapshot of the asset's physical configuration (e.g., circuit breaker positions, switch positions, etc.), which may take the form of Boolean values or the like. Other examples are possible as well. (It should be understood that in addition to the load-test variables, the under-load report may also include other data that is not necessarily of interest for a load test).

In some cases, the set of load-test variables in an asset-triggered under-load report may be different than the set of load-test variables in a user-triggered under-load report. For example, the set of load-test variables in a user-triggered under-load report may include additional variables that provide a snapshot of the asset's physical configuration, whereas such variables may not be included in an asset-triggered under-load report. In other cases, the set of load-test variables in an asset-triggered under-load report may be the same as the set of load-test variables in a user-triggered under-load report.

After receiving the under-load report(s) from the asset, the asset data platform may then use the under-load report(s) to carry out the disclosed process for conducting virtual load tests.

For instance, the asset data platform may begin the disclosed process by collecting and/or otherwise obtaining under-load reports sent by a group of assets (sometimes referred to as a "fleet" of assets) over a prolonged period of time in the past, such as a number of months or years. In practice, the group of assets may be assets having similar identifying characteristics, such as similar (or the same) brand, make, model, age, firmware version, location, and/or type of industry (e.g., passenger, heavy freight, light fright) associated with the group of assets, among other examples. These under-load reports may be referred to herein as "historical" under-load reports, and in line with the discussion above, each of the historical under-load reports may include a snapshot of values for the set of load-test variables. In turn, the asset data platform may perform an analysis of the historical under-load reports in order to define a respective range of acceptable values for each load-test variable, which may generally comprise a range of values for the load-test variable that is consistent with the normal or intended operation of the asset. In practice, the defined range of acceptable values for a given load-test variable may take the form of a minimum acceptable value, a maximum acceptable value, or both, among other examples. (It should be understood that the term "range" as used herein is not limited to a single consecutive range of values, and it is possible that a range for a given load-test variable could encompass multiple non-consecutive ranges of values). These operations may be referred to as the "training phase" of the disclosed process.

The asset data platform's analysis of the historical under-load reports may take various forms. In one implementation, the asset data platform may begin by evaluating the historical values for each load-test variable to determine a representative historical value for each load-test variable. The representative historical value for each load-test variable may be determined in various ways.

In one example, determining the representative historical value for each load-test variable may involve determining a historical average (e.g., the historical mean, median, or mode) of the historical values for each load-test variable. In another example, determining the representative historical value for each load-test variable may involve (1) removing historical values for each load-test variable that are outliers (e.g., values that are in the top and/or bottom 5%) and (2) determining a historical average based on the remaining historical values for each load-test variable. In yet another example, determining the representative historical value for each load-test data variable may involve determining a historical weighted average of the historical values for each load-test variable by taking various factors into account. For instance, when assigning weights to historical values for a given load-test variable, the asset data platform may take factors into account such as the particular time of year when the historical values were captured, the particular location at which the historical values were captured, the particular weather conditions at the location where the historical values were captured, and/or certain attributes of the particular assets that captured the historical values (e.g., asset age), among other examples. In still another example, instead of using factors such as these to weight the historical values for a load-test variable, the asset data platform may separate out the historical values into different subsets that are associated with different capture circumstances (e.g., different times of year, different locations, different weather conditions, different asset ages, etc.) and then determine a representative historical value for the given-load test variable for each different capture circumstance. Other examples are possible as well.

Based on the representative historical value for each load-test variable, the asset data platform may then define a range of acceptable values for each load-test variable. This function may take various forms. As one possibility, defining the range of acceptable values for a given load-test variable may involve defining a minimum acceptable value, a maximum acceptable value, or both based on the representative historical value for the given load-test variable. For example, the asset data platform could determine a historical average for a given load-test variable (e.g., the historical mean, median, or mode) and then use that historical average to define a minimum acceptable value and/or maximum acceptable for the given load-test variable, such as by setting a minimum acceptable value to be a value that is a given number of standard deviations (e.g., one standard deviation) below the historical average and/or setting a maximum acceptable value to be a value that is a given number of standard deviations (e.g., one standard deviation) above than the historical average. Other examples are possible as well.

After the respective range of acceptable values for each load-test variable is defined during the training phase, the asset data platform may then be capable of initiating a virtual load test for a given asset that is operating in the field based on the most recent one or more under-load reports (e.g., user-triggered under-load report, asset-triggered under-load report) received from the given asset.

The asset data platform may initiate a virtual load test for a given asset in response to various triggering events. According to one implementation, the asset data platform may provide a graphical user interface (GUI) through which a user may request to initiate a virtual load test for a given asset (e.g., by accessing the GUI via a client station that is communicatively coupled to the asset data platform), in which case the asset data platform may initiate a virtual load test for a given asset in response to a request received via the GUI.

According to another implementation, the asset data platform may initiate a virtual load test for a given asset in response to receiving a user-triggered under-load report (which may be sent to the asset data platform before the given asset is released from a repair shop, as one example). According to yet another implementation, the asset data platform may initiate a virtual load test for a given asset according to a predefined schedule. Other implementations are possible as well.

After deciding to initiate the virtual load test, the asset data platform may access the most recent one or more under-load reports received from the given asset, each of which includes a recent snapshot of values for the set of load-test variables that were captured by the given asset while operating under the given set of load conditions. The values for the load-test variables included in the most recent one or more under-load reports received from the given asset may be referred to herein as "observation values." For instance, in one implementation, the asset data platform may access only the last under-load report received from the given asset, in which case the snapshot values for the load-test variables included in the last-received under-load report are used as the given asset's observation values. In another implementation, the asset data platform may access the last several under-load reports received from the given asset (e.g., the 5 most recent under-load reports received), in which case the asset data platform may determine a representative value for each load-test variable based on the last several under-load reports and then use these representative values as the given asset's observation values. Other implementations are possible as well.

Additionally, after deciding to initiate the virtual load test, the asset data platform may access ranges of acceptable values for the load-test variables that were defined during the training phase of the disclosed process. This function of accessing the ranges for the given asset's virtual load test may vary depending on the implementation. For instance, in one implementation, the asset data platform may define and maintain a single set of ranges that apply to all assets in the field, in which case the asset data platform may simply access and use that single set of ranges for the given asset's virtual load test. In another implementation, the asset data platform may define and maintain multiple sets of ranges that correspond to different capture circumstances (e.g., different times of year, different locations, different weather conditions, different asset ages, etc.), in which case the asset data platform may use the capture circumstances associated with the given asset's one or more under-load reports to select the particular set of ranges to access and use for the given asset's virtual load test. The function of accessing the ranges for the given asset's virtual load test may take other forms as well.

In turn, the asset data platform may execute the virtual load test for the given asset by comparing the given asset's observation values for the load-test variables to the accessed ranges of acceptable values for the load-test variables and thereby identifying any load-test variable for which the given asset's observation value falls outside of the range of acceptable values. The asset data platform may perform this function in various manners.

According to one implementation, for each load-test variable, the asset data platform may (1) compare the given asset's respective observation value for the load-test variable to the respective range of acceptable values for the load-test variable, (2) based on the comparison, determine whether the given asset's respective observation value falls outside of the respective range of acceptable values for the load-test variable, and (3) if so, flag the load-test variable as one for which the given asset's observation value falls outside of the range of acceptable values. The function of comparing the given asset's observation values for the load-test variables to the accessed ranges of acceptable values for the load-test variables may take other forms as well.

After comparing the given asset's observation values for the load-test variables to the accessed ranges of acceptable values for the load-test variables, the asset data platform may then store the results of the virtual load test and present the results at a given time. Presenting the results of the virtual load test may take various forms. In one implementation, in response to completing the virtual load test, the asset data platform may send the results of the virtual load test to a given client station (e.g., the client station running the GUI through which a user requested that the virtual load test be initiated). In turn, the results of the virtual load test may be displayed via the GUI of the client station.

In another implementation, a user may subscribe to an alert that causes the asset data platform to notify the user whenever results of the given asset's virtual load test are available. The asset data platform may then send the alert to notify the user that the results are available. In turn, the user may cause the asset data platform to present results of the virtual load test for the given asset (e.g., via a client station).

Further, the results of the virtual load test may take various forms. As one possibility, the results of the virtual load test may include an indication of each load-test variable for which the given asset's observation value falls outside of the range of acceptable values. Such an indication may be presented to a user via the GUI in the form of text and/or graphics intended to notify the user that the given asset's observation value for the load-test variable falls outside of the range of acceptable values for the load-test variable.

As another possibility, the results of the virtual load test may include a representation of the given asset's observation values and/or the ranges of acceptable values for the set of load-test variables, or at least a subset thereof (e.g., the subset of load-test variables for which the given asset's observation values fall outside of the ranges of acceptable values). Such a representation may then be presented to a user via the GUI in the form of text and/or graphics intended to notify the user of the given asset's respective observation value and/or the respective range of acceptable values for each of the load-test variables.

As yet another possibility, the results of the virtual load test may include a prediction as to why the given asset's observation value falls outside of the range of acceptable values for at least one load-test variable. Such a representation may then be presented to a user via the GUI in the form of text and/or graphics intended to deliver the prediction to the user.

As still another possibility, the results of the virtual load test may include the results of a trending analysis for the given asset's observation values for the load-test variables over a period of time, which may indicate how the given asset's observation values for the load-test variables have been changing (e.g., whether the values are trending up or down). These trending analysis results may then be presented to a user via the GUI in the form of text and/or graphics (e.g., up or down arrows) intended to notify the user how the given asset's observation values are trending.

Additionally, the results of the virtual load test may include identifying information for the given asset, such asset identifier, asset type, asset age, and/or asset location, among other characteristics associated with the asset.

Further, as another possibility, after completing the virtual load test, the asset data platform may conduct some additional analysis to determine whether the asset is "cleared for release." This analysis may be based on the results of the virtual load test and/or additional data available to the asset data platform (e.g., data indicating the physical configuration of the asset). As a result of this analysis, the asset data platform may present an indication on whether the asset is cleared for release, which may ensure the user that the asset can safely operate in the field as intended under certain operating conditions.

In addition to presenting the results of the virtual load test, the GUI may also include one or more controls to modify the ranges of acceptable values for the load-test variables. Modifying the ranges of acceptable values for the load-test variable may cause the asset data platform to present the results of the virtual load test in various forms. In one example, in response to modifying the ranges of acceptable values for the load-test variables, the asset data platform may cause the GUI to present the results of the virtual load test relative to the modified ranges of acceptable values. In another example, in response to modifying the ranges of acceptable values for the load-test variables, the asset data platform may cause the GUI to present the results of the virtual load test relative to the modified ranges of acceptable values, in addition to providing one or more indications as to how such results relate to the unmodified ranges of acceptable values. Other examples are possible as well.

The systems, devices, and methods disclosed herein may thus leverage the benefits of initiating and performing a virtual load test during operation of a given asset in the field, while replacing the need to perform a load test under simulated real world operating conditions at a repair shop during planned or unplanned maintenance periods.

Accordingly, in one aspect, disclosed herein is a method that involves (a) analyzing historical under-load reports sent by a group of assets and thereby defining a respective range of acceptable values for each load-test variable in a set of load-test variables included in the historical under-load reports, (b) receiving one or more under-load reports from a given asset, (c) carrying out a virtual load test for the given asset by (i) accessing a most recent under-load report received from the given asset, wherein the most recent under-load report comprises a respective observation value for each load-test variable in the set of load-test variables, (ii) accessing the respective range of acceptable values for each load-test variable in the set of load-test variables, (iii) for each load-test variable in the set of load-test variables, performing a comparison between the respective observation value for the load-test variable included in the most recent under-load report and the respective range of acceptable values for the load-test variable, and (iv) based on the comparisons, identifying any load-test variable in the set of load-test variables for which the respective observation value included in the most recent under-load report falls outside of the respective range of acceptable values, and (d) after carrying out the virtual load test for the given asset, causing a client station to present results of the virtual load test for the given asset, wherein the results comprise an indication of each identified load-test variable for which the respective observation value in the most recent under-load report falls outside of the respective range of acceptable values.

In another aspect, disclosed herein is a computing system comprising a network interface, at least one processor, a non-transitory computer-readable medium, and program instructions stored on the non-transitory computer-readable medium that are executable by the at least one processor to cause the computing system to carry out the functions disclosed herein associated with performing virtual load tests.

In yet another aspect, disclosed herein is a non-transitory computer-readable medium having instructions stored thereon that are executable to cause a computing system to carry out the functions disclosed herein associated with performing virtual load tests.

One of ordinary skill in the art will appreciate these as well as numerous other aspects in reading the following disclosure.

BRIEF DESCRIPTION OF THE DRAWINGS

FIG. 7 depicts an interface of an example GUI displaying the results of the virtual load test.

DETAILED DESCRIPTION

The following disclosure makes reference to the accompanying figures and several exemplary embodiments. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
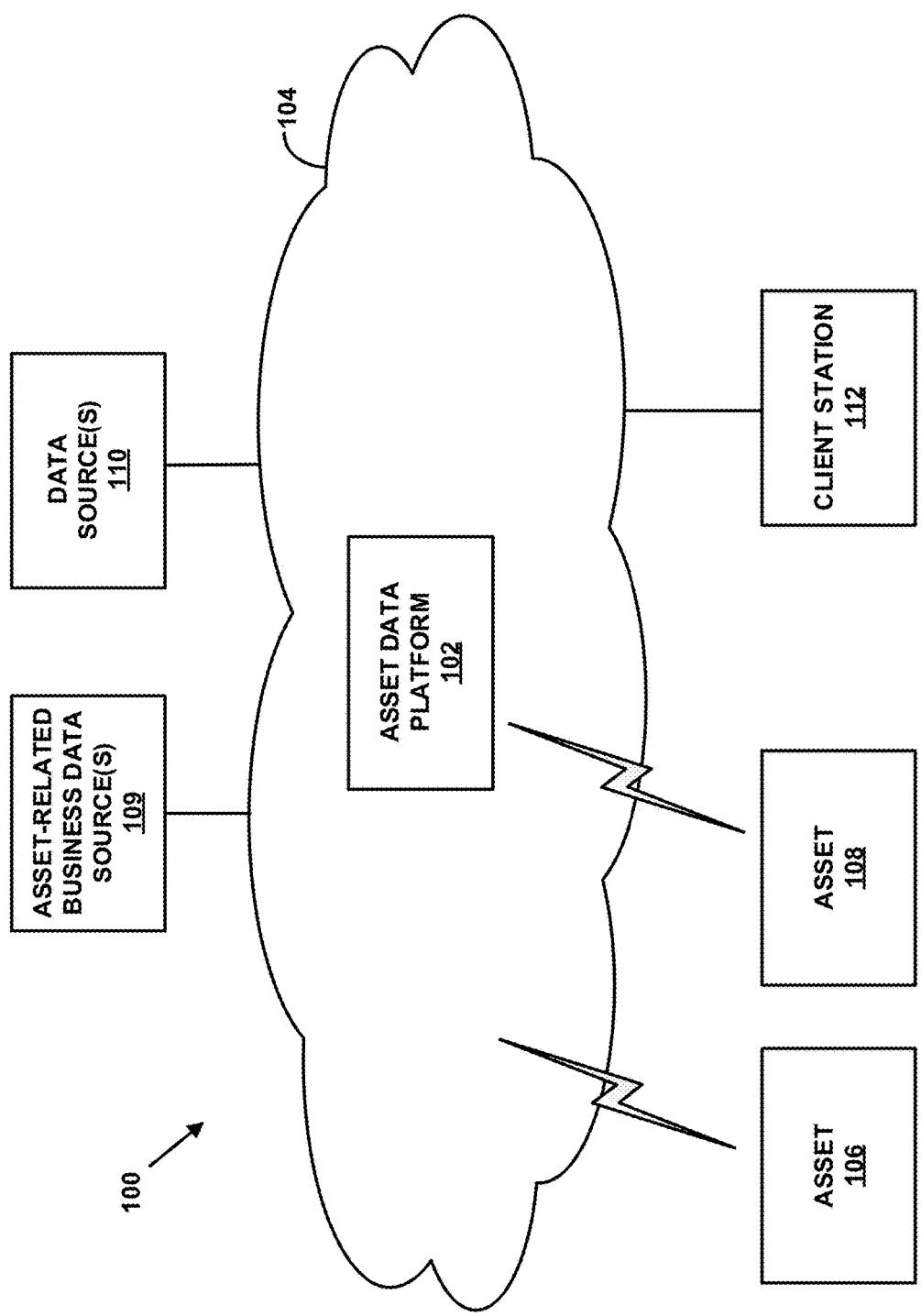
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as an asset data platform, which may communicate via a communication network 104 with one or more assets, such as representative assets 106 and 108, one or more data sources, such as asset-related business data source 109 and representative data source 110, and one or more output systems, such as representative client station 112. It should be understood that the network configuration may include various other systems as well.

Broadly speaking, the asset data platform 102 (sometimes referred to herein as an "asset condition monitoring system") may take the form of one or more computer systems that are configured to receive, ingest, process, analyze, and/or provide access to asset-related data. For instance, a platform may include one or more servers (or the like) having hardware components and software components that are configured to carry out one or more of the functions disclosed herein for receiving, ingesting, processing, analyzing, and/or providing access to asset-related data. Additionally, a platform may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well. The asset data platform 102 is discussed in further detail below with reference to FIG. 4.

As shown in FIG. 1, the asset data platform 102 may be configured to communicate, via the communication network 104, with the one or more assets, data sources, and/or output systems in the network configuration 100. For example, the asset data platform 102 may receive asset-related data, via the communication network 104, that is sent by one or more assets and/or data sources. As another example, the asset data platform 102 may transmit asset-related data and/or commands, via the communication network 104, for receipt by an output system, such as a client station, a work-order system, a parts-ordering system, etc. The asset data platform 102 may engage in other types of communication via the communication network 104 as well.

In general, the communication network 104 may include one or more computing systems and network infrastructure configured to facilitate transferring data between asset data platform 102 and the one or more assets, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the asset data platform 102 and the one or more assets, data sources, and/or output systems may include one or more intermediate systems. For example, the one or more assets and/or data sources may send asset-related data to one or more intermediary systems, such as an asset gateway or an organization's existing platform (not shown), and the asset data platform 102 may then be configured to receive the asset-related data from the one or more intermediary systems. As another example, the asset data platform 102 may communicate with an output system via one or more intermediary systems, such as a host server (not shown). Many other configurations are also possible.

In general, the assets 106 and 108 may take the form of any device configured to perform one or more operations (which may be defined based on the field) and may also include equipment configured to transmit data indicative of the asset's attributes, such as the operation and/or configuration of the given asset. This data may take various forms, examples of which may include signal data (e.g., sensor/actuator data), fault data (e.g., fault codes), location data for the asset, identifying data for the asset, etc.

Representative examples of asset types may include transportation machines (e.g., locomotives, aircrafts, passenger vehicles, semi-trailer trucks, ships, etc.), industrial machines (e.g., mining equipment, construction equipment, processing equipment, assembly equipment, etc.), medical machines (e.g., medical imaging equipment, surgical equipment, medical monitoring systems, medical laboratory equipment, etc.), utility machines (e.g., turbines, solar farms, etc.), and unmanned aerial vehicles, among other examples. Additionally, the assets of each given type may have various different configurations (e.g., brand, make, model, firmware version, etc.).

As such, in some examples, the assets 106 and 108 may each be of the same type (e.g., a fleet of locomotives or aircrafts, a group of wind turbines, a pool of milling machines, or a set of magnetic resonance imagining (MM) machines, among other examples) and perhaps may have the same configuration (e.g., the same brand, make, model, firmware version, etc.). In other examples, the assets 106 and 108 may have different asset types or different configurations (e.g., different brands, makes, models, and/or firmware versions). For instance, assets 106 and 108 may be different pieces of equipment at a job site (e.g., an excavation site) or a production facility, among numerous other examples. Those of ordinary skill in the art will appreciate that these are but a few examples of assets and that numerous others are possible and contemplated herein.

Depending on an asset's type and/or configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the asset-related business data source 109 may include one or more computing systems configured to collect, store, and/or provide asset-related business data that may be produced and consumed across a given organization. In some instances, asset-related business data may include various categories that are classified according to the given organization's process, resources, and/or standards. In one example, asset-related business data may include point-of-sale (POS) data, customer relationship management (CRM) data, and/or enterprise resource planning (ERP) data, as examples. Asset-related business data may also include broader categories of data, such inventory data, location data, financial data, employee data, and maintenance data, among other categories. In operation, the asset data platform 102 may be configured to receive data from the asset-related business data source 109 via the communication network 104. In turn, the asset data platform 102 may store, provide, and/or analyze the received enterprise data.

The data source 110 may also include one or more computing systems configured to collect, store, and/or provide data that is related to the assets or is otherwise relevant to the functions performed by the asset data platform 102. For example, the data source 110 may collect and provide operating data that originates from the assets (e.g., historical operating data), in which case the data source 110 may serve as an alternative source for such asset operating data. As another example, the data source 110 may be configured to provide data that does not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

In practice, the asset data platform 102 may receive data from the data source 110 by "subscribing" to a service provided by the data source. However, the asset data platform 102 may receive data from the data source 110 in other manners as well.

The client station 112 may take the form of a computing system or device configured to access and enable a user to interact with the asset data platform 102. To facilitate this, the client station may include hardware components such as a user interface, a network interface, a processor, and data storage, among other components. Additionally, the client station may be configured with software components that enable interaction with the asset data platform 102, such as a web browser that is capable of accessing a web application provided by the asset data platform 102 or a native client application associated with the asset data platform 102, among other examples. Representative examples of client stations may include a desktop computer, a laptop, a netbook, a tablet, a smartphone, a personal digital assistant (PDA), or any other such device now known or later developed.

Other examples of output systems may take include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. Example Asset

Figure 2:
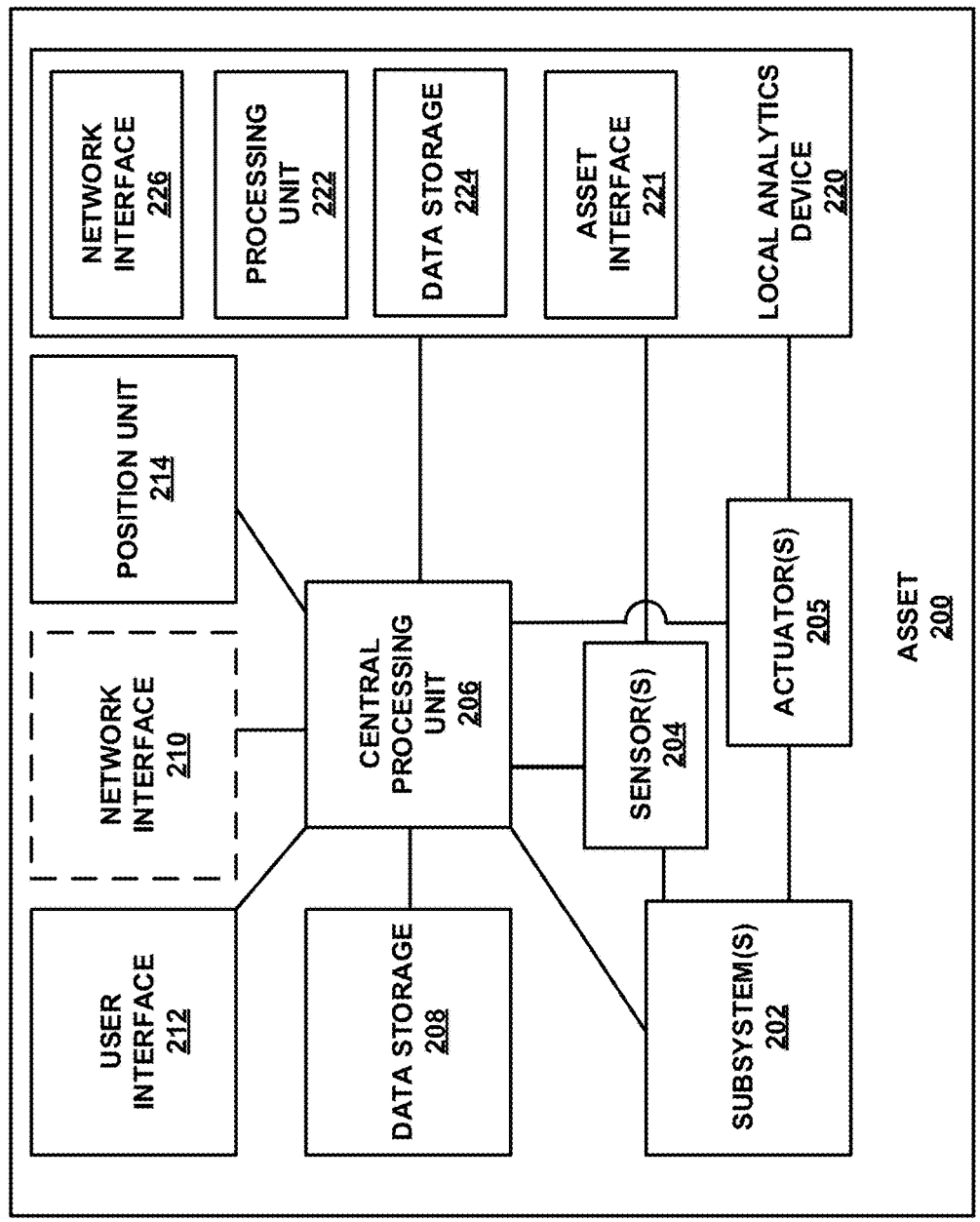
FIG. 2 depicts a simplified block diagram of an example asset.

Turning to FIG. 2, a simplified block diagram of an example asset 200 is depicted. Either or both of assets 106 and 108 from FIG. 1 may be configured like the asset 200. As shown, the asset 200 may include one or more subsystems 202, one or more sensors 204, one or more actuators 205, a central processing unit 206, data storage 208, a network interface 210, a user interface 212, and a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal (e.g., "signal data"), of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit

206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like.

Additionally, various sensors 204 may be configured to measure other operating conditions of the asset 200, examples of which may include temperatures, pressures, speeds, acceleration or deceleration rates, friction, power usages, throttle positions, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208. Additionally, the central processing unit 206 may be configured to access and/or generate data reflecting the configuration of the asset (e.g., model number, asset age, software versions installed, etc.).

The central processing unit 206 may also be configured to determine whether received sensor and/or actuator signals trigger any abnormal-condition indicators, such as fault codes, which is a form of fault data. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the asset data platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the asset data platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
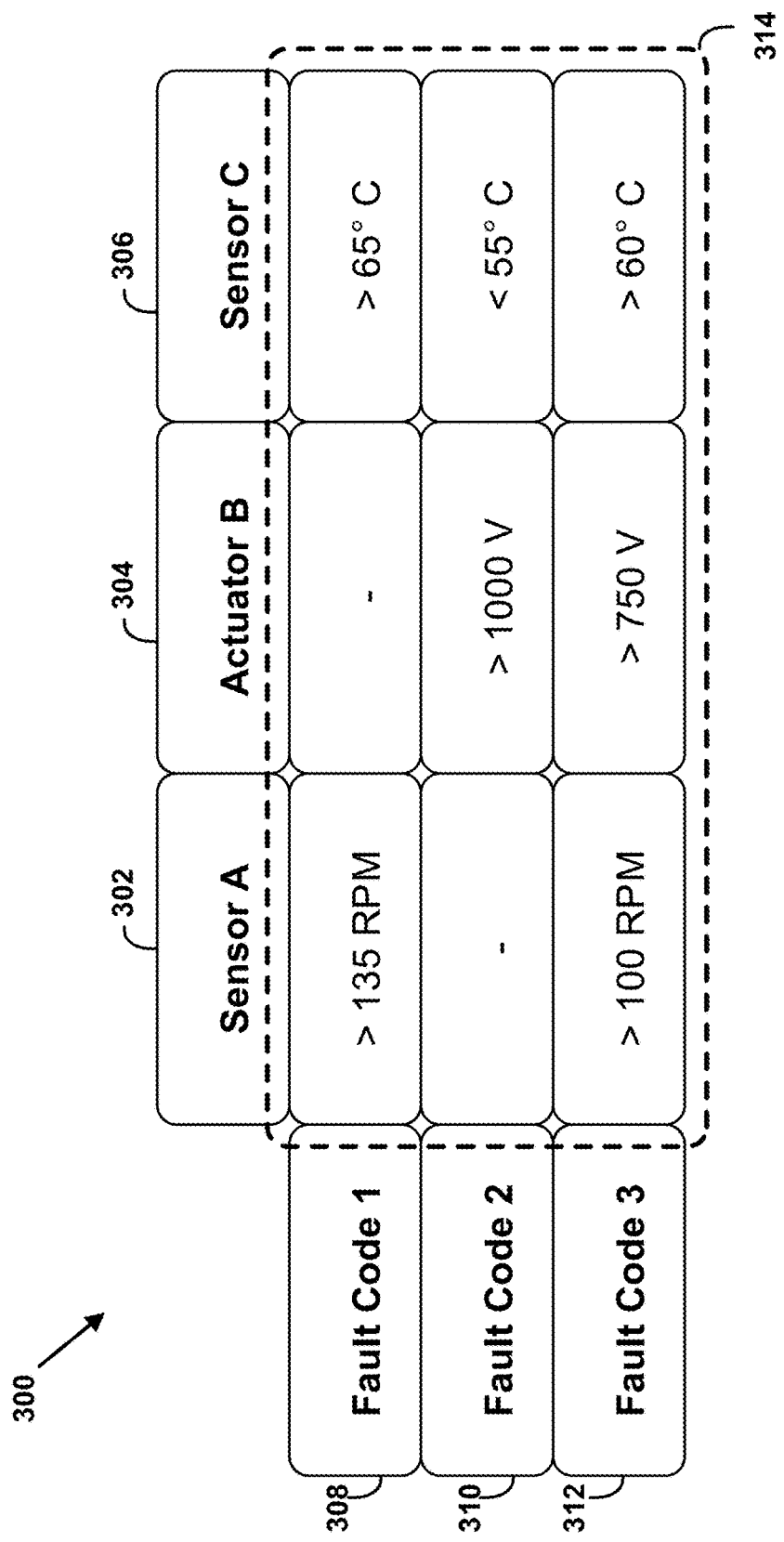
FIG. 3 depicts a conceptual illustration of example abnormal-condition indicators and triggering criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, and/or the user interfaces 212 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The local analytics device 220 may generally be configured to receive and analyze data related to the asset 200 and based on such analysis, may cause one or more operations to occur at the asset 200. For example, the local analytics device 220 may receive operating data for the asset 200 (e.g., signal data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that is generated by sensors 204 and/or actuators 205 and sent to the central processing unit 206) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as the asset data platform 102 or the output system 112, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be the same or similar to the network interfaces described above. In practice, the network interface 226 may facilitate communication between the local analytics device 220 and the asset data platform 102.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. Example Platform

Figure 4:
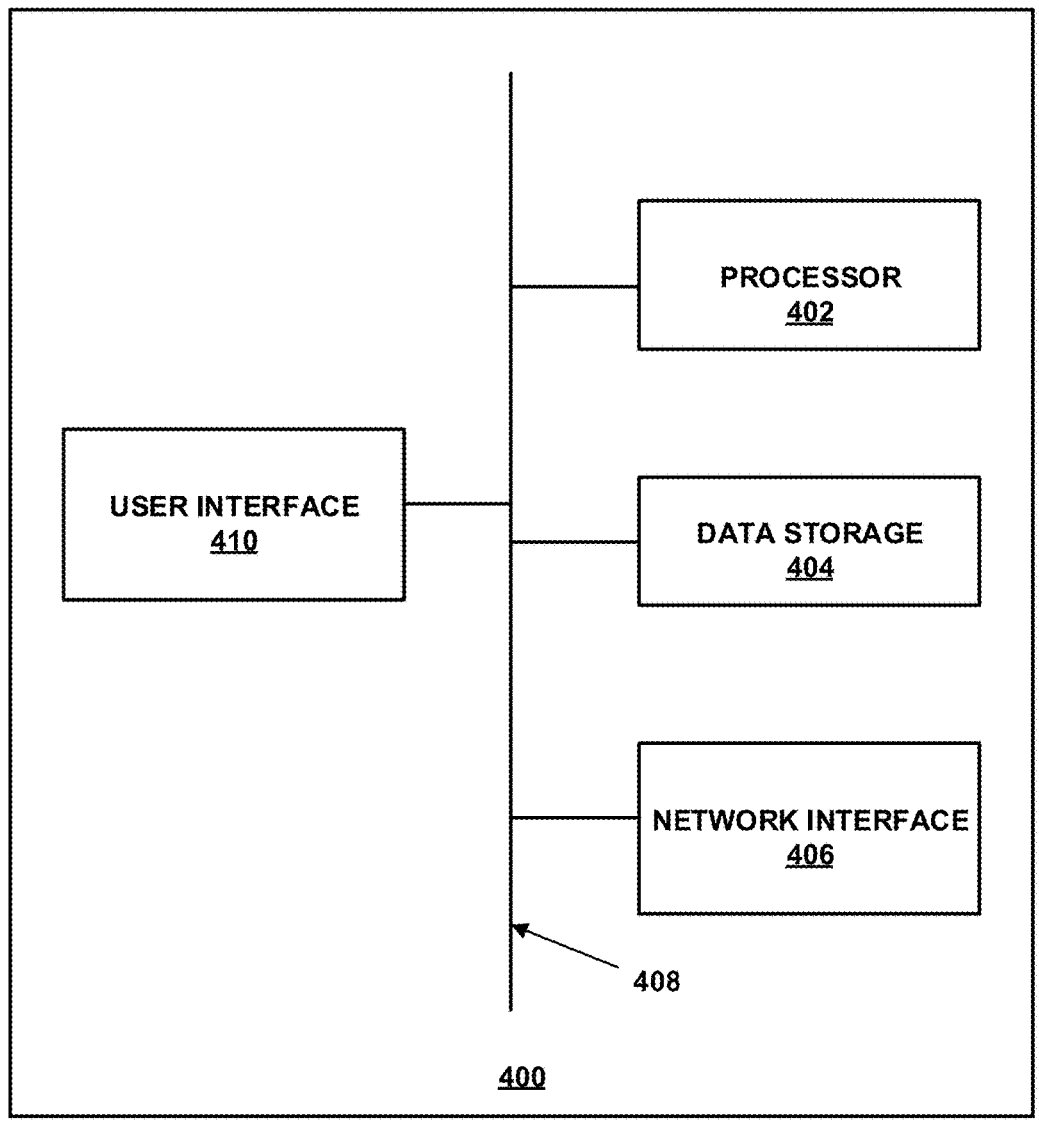
FIG. 4 depicts a simplified block diagram of an example analytics system.

FIG. 4 is a simplified block diagram illustrating some components that may be included in an example data asset platform 400 from a structural perspective. In line with the discussion above, the data asset platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown in FIG. 4, the data storage 404 may be provisioned with software components that enable the platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the platform 400 and various network components via the communication network 104, such as assets 106 and 108, data source 110, and client station 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include Hadoop, FTP, relational databases, high frequency data such as OSI PI, batch data such as XML, and Base64. Other configurations are possible as well.

The example data asset platform 400 may also support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
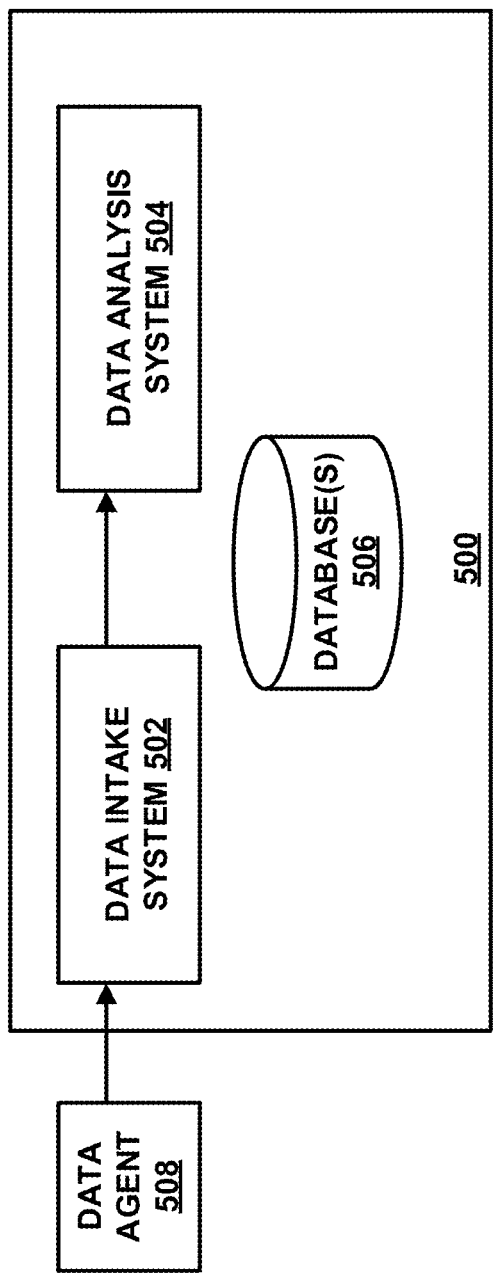
FIG. 5 depicts a functional block diagram of an example platform.

Referring now to FIG. 5, another simplified block diagram is provided to illustrate some components that may be included in an example platform 500 from a functional perspective. For instance, as shown, the example platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive asset-related data and then provide at least a portion of the received data to the data analysis system 504. As such, the data intake system 502 may be configured to receive asset-related data from various sources, examples of which may include an asset, an asset-related data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an organization's existing platform/system, an external asset-related data source, etc.), that source may be provisioned with a data agent 508. In general, the data agent 508 may be a software component that functions to access asset-related data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting asset-related data to the example platform 500 without the assistance of a data agent.

The asset-related data received by the data intake system 502 may take various forms. As one example, the asset-related data may include data related to the attributes of an asset in operation, which may originate from the asset itself or from an external source. This asset attribute data may include asset operating data such as signal data (e.g., sensor and/or actuator data), fault data, asset location data, weather data, hotbox data, etc. In addition, the asset attribute data may also include asset configuration data, such as data indicating the asset's brand, make, model, age, software version, etc. As another example, the asset-related data may include certain attributes regarding the origin of the asset-related data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. These attributes may come in the form of signal signatures or metadata, among other examples. The asset-related data received by the data intake system 502 may take other forms as well.

The data intake system 502 may also be configured to perform various pre-processing functions on the asset-related data, in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping certain any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received asset-related data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received asset-related data in a first type of database (e.g., a time-series or document database) and may store the associated metadata of received asset-related data in a second type of database that permit more rapid searching (e.g., a relational database). In such an example, the metadata may then be linked or associated to the asset-related data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into three general categories: (1) signal data, (2) event data, and (3) asset configuration data. The signal data may generally take the form of raw or aggregated data representing the measurements taken by the sensors and/or actuators at the assets. The event data may generally take the form of data identifying events that relate to asset operation, such as faults and/or other asset events that correspond to indicators received from an asset (e.g., fault codes, etc.), inspection events, maintenance events, repair events, fluid events, weather events, or the like. And asset configuration information may then include information regarding the configuration of the asset, such as asset identifiers (e.g., serial number, model number, model year, etc.), software versions installed, etc. The data provided to the data analysis system 504 may also include other data and take other forms as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing asset-related data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below. One of ordinary skill in the art will appreciate that the example platform shown in FIG. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. Example Operations

The operations of the example network configuration 100 depicted in FIG. 1 will now be discussed in further detail below. To help describe some of the operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, in accordance with the present disclosure, a computing system such as the asset data platform 102 may be configured to conduct a virtual load test on an asset (e.g., asset 106 and/or 108) to determine whether the asset can operate as intended under certain load conditions.

In general, the asset data platform 102 may be configured to receive operating data from a plurality of assets in the field, each of which may be equipped with various sensors and/or actuators distributed throughout the asset that monitor the operating conditions of the asset. As one representative example, an asset may be a locomotive, and the sensors and/or actuators may monitor parameters such as temperatures, pressures, fluid levels, voltages, and/or speeds, among other examples. Additionally, the asset may be configured to transmit a given type of operating data report to an asset data platform, which may be referred to herein as an "under-load report." The asset may transmit an under-load report at various instances. In one instance, the asset 106 may transmit the under-load report to the asset data platform 102 when the asset 106 experiences a given set of load conditions. Such an under-load report may be referred to herein as an "asset-triggered under-load report." The given set of load conditions may take various forms. As one example, the given set of load conditions may include a threshold speed (e.g., 20 MPH) and a requirement that the asset may be in full throttle. As another example, the given set of load conditions may include a threshold pressure level, temperature, voltage, and/or fluid level, among other examples.

In another instance, the asset may transmit the under-load report to the asset data platform 102 in response to operator input. For example, an operator at the asset 106 (or at a remote location) may activate one or more controls to cause the asset 106 to send an under-load report to the asset data platform 102. Such an underload report may be referred to herein as a "user-triggered under-load report."

In practice, an operator may activate one or more controls at a given time to cause the asset 106 to send a user-triggered under-load report to the asset data platform 102. The one or more controls may include, for example, a mechanical control (switch, button, etc), or a control in a software application running on a client station (e.g., client station 112) that is communicatively coupled to the asset 106. Other examples are possible as well. In one implementation, the operator may activate the one or more controls if the operator believes there is an issue with the asset 106 in the field while operating under certain load conditions. In one implementation, the operator may activate the one or more controls while the asset 106 is at a repair shop to ensure that the asset 106 will operate as intended under certain load conditions before it leaves the repair shop (e.g., at a time that a human technician would typically conduct a conventional load test). In another implementation, the operator may activate the one or more controls if the operator believes there is an issue with the asset 106 while operating in the field.

Further, the under-load report (e.g., user-triggered under-load report or asset-triggered under-load report) transmitted by an asset (e.g., asset 106) may take various forms. At a high level, each under-load report may include values for a given set of operating data variables that are of interest for a load test, such as a snapshot of the most-recent measurements from a given set of sensors and/or actuators at the asset (e.g., sensors 204 and/or actuators 205 of asset 200). This given set of operating data variables may be referred to herein as the "load-test variables."

The set of load-test variables may include standard diagnostic variables for the asset, such as horsepower, RPM, fuel level, voltage, current, coolant pressure, as examples, as well as other "in-motion" variables for which values are generally only available when the asset is in motion, such as traction motor RPMs as an example. Notably, these in-motion variables are typically not available when a load test is performed at a repair shop under simulated load conditions. The set of load-test variables may also include other variables that may be of interest for a load test as well. For example, the set of load-test variables may also include external weather data, such as ambient temperature, air pressure, among other examples, which may be influencing measurements taken at the asset (e.g., asset 106). As another example, the set of load-test variables in an under-load report may include additional variables that provide a snapshot of the asset's physical configuration (e.g., circuit breaker positions, switch positions, etc.), which may take the form of Boolean values or the like. Other examples are possible as well. (It should be understood that in addition to the load-test variables, the under-load report may also include other data that is not necessarily of interest for a load test).

In some cases, the set of load-test variables in an asset-triggered under-load report may be different than the set of load-test variables in a user-triggered under-load report. For example, the set of load-test variables in a user-triggered under-load report may include additional variables that provide a snapshot of the asset's physical configuration, whereas such variables may not be included in an asset-triggered under-load report. In other cases, the set of load-test variables in an asset-triggered under-load report may be the same as the set of load-test variables in a user-triggered under-load report.

After receiving under-load report(s) from the asset, the asset data platform 102 may then use the under-load report(s) to carry out the disclosed process of conducting a virtual load test for a given asset, such as asset 106 and asset 108.

Figure 6:
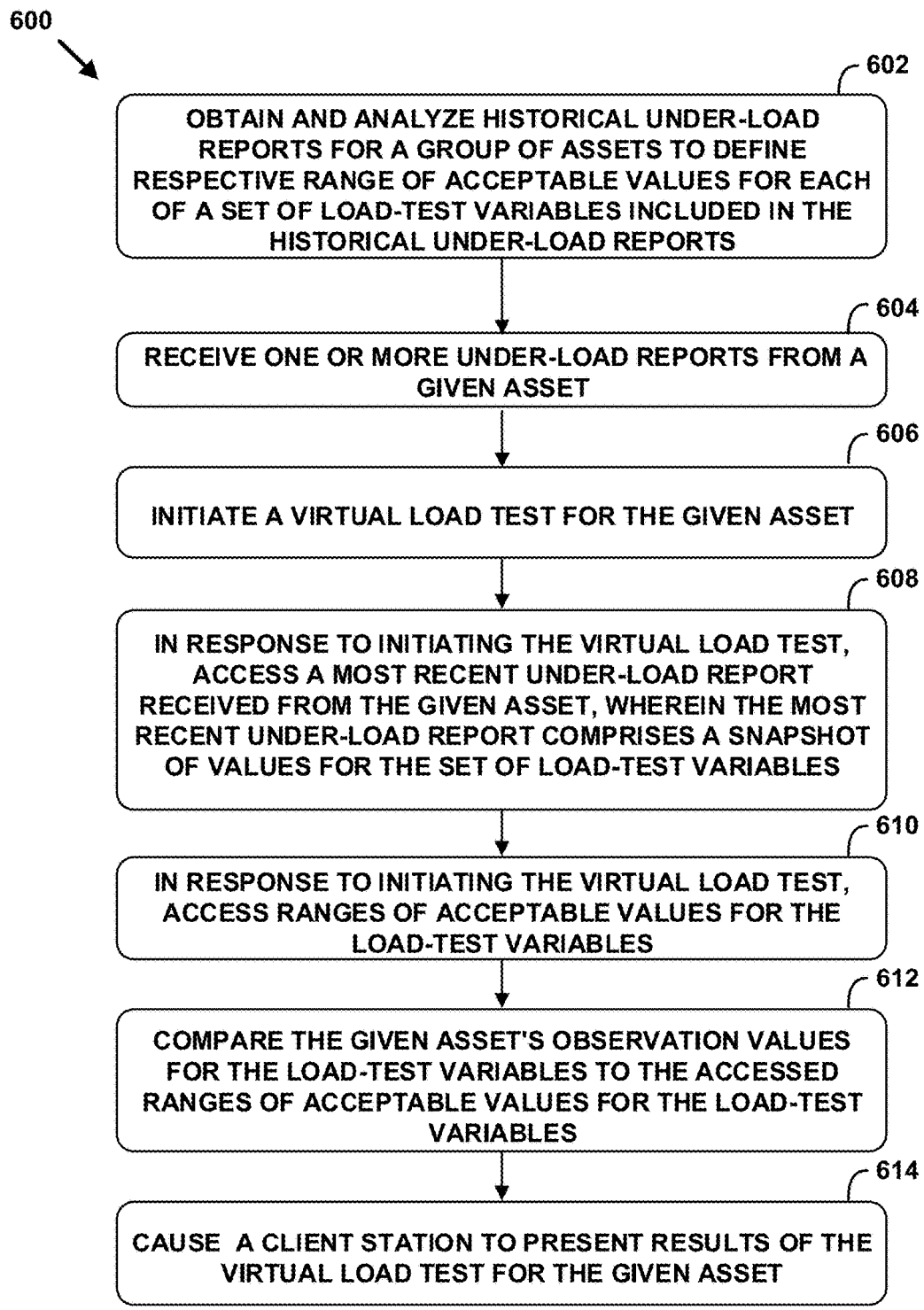
FIG. 6 depicts a flow diagram of an example method for performing a virtual load test.

FIG. 6 is a flow diagram 600 of example functions associated with conducting a virtual load test for a given asset, such as asset 106 and asset 108. For the purposes of explanation, these example functions are described as being carried out by the asset data platform 102, but some or all of the example functions could be performed by systems other than the platform or which work in conjunction with the platform. Further, it should be understood that flow diagram 600 is provided for sake of clarity and explanation and that numerous other combinations of functions may be utilized to facilitate conducting a virtual load test for an asset—including the possibility that example functions may be added, removed, rearranged into different orders, combined into fewer blocks, and/or separated into additional blocks depending upon the particular embodiment.

Briefly, at block 602, the asset data platform 102 may obtain and analyze historical under-load reports for a group of assets to define a respective range of acceptable values for each of a set of load-test variables included in the historical under-load reports. At block 604, the asset data platform 102 may receive one or more under-load reports from a given asset (e.g., asset 106 or asset 108). At block 606, the asset data platform 102 may initiate a virtual load test for the given asset. At block 608, in response to initiating the virtual load test, the asset data platform 102 may access a most recent under-load report received from the given asset, which comprise a snapshot of values for the set of load-test variables. At block 610, in response to initiating the virtual load test, the asset data platform 102 may also access ranges of acceptable values for the load-test variables. At block 612, the asset data platform 102 may compare the given asset's observation values for the load-test variables to the accessed ranges of acceptable values for the load-test variables, to identify any load-test variable for which the given asset's observation value falls outside of the range of acceptable values. Lastly, at block 614, the asset data platform 102 may cause a client station (e.g., client station 112) to present results of the virtual load test for the given asset (e.g., asset 106 or asset 108). These example functions will now be described in further detail below.

Turning now to a more detailed discussion of these example functions, at block 602, the asset data platform 102 may obtain and analyze historical under-load reports for a group of assets to define a respective range of acceptable values for each of a set of load-test variables included in the historical under-load reports. For instance, the asset data platform 102 may begin collecting and/or otherwise obtaining under-load reports sent by a group of assets (sometimes referred to as a "fleet" of assets) over a prolonged period of time in the past, such as a number of days, months, or years. In practice, the group of assets may be assets having similar identifying characteristics, such as similar (or the same) brand, make, model, age, firmware version, location, and/or type of industry (e.g., passenger, heavy freight, light fright) associated with the group of assets, among other examples.

These under-load reports may be referred to herein as "historical" under-load reports, and in line with the discussion above, each of the historical under-load reports may include a snapshot of values for the set of load-test variables.

In turn, the asset data platform 102 may perform an analysis of the historical under-load reports in order to define a respective range of acceptable values for each load-test variable, which may generally comprise a range of values for the load-test variable that is consistent with the normal or intended operation of the asset. In practice, the defined range of acceptable values for a given load-test variable may take the form of a minimum acceptable value, a maximum acceptable value, or both, among other examples. (It should be understood that the term "range" as used herein is not limited to a single consecutive range of values, and it is possible that a range for a given load-test variable could encompass multiple non-consecutive ranges of values). These operations may be referred to as the "training phase" of the disclosed process.

The asset data platform 102 may analyze the historical under-load reports in various ways. In one implementation, the asset data platform 102 may begin by evaluating the historical values for each load-test variable to determine a representative historical value for each load-test variable. The representative historical value for each load-test variable may be determined in various ways.

In one example, determining the representative historical value for each load-test variable may involve determining a historical average (e.g., the historical mean, median, or mode) of the historical values for each operating data variable.

In another example, determining the representative historical value for each load-test variable may involve (1) removing historical values for each load-test variable that are outliers (e.g., values that are in the top and/or bottom 5%) and then (2) determining a historical average based on the remaining historical values for each load-test variable.

In yet another example, determining the representative historical value for each load-test data variable may involve determining a historical weighted average of the historical values for each load-test variable by taking various factors into account. For instance, when assigning weights to historical values for a given load-test variable, the asset data platform 102 may take factors into account such as the particular time of year when the historical values were captured, the particular location at which the historical values were captured, the particular weather conditions at the location where the historical values were captured, and/or certain attributes of the particular assets that captured the historical values (e.g., asset age, intended usage of the asset, etc.), among other examples.

In still another example, instead of using factors such as these to weigh the historical values for a load-test variable, the asset data platform 102 may separate out the historical values into different subsets that are associated with different capture circumstances (e.g., different times of year, different locations, different weather conditions, different asset ages, etc.) and determine a representative historical value for the given-load test variable for each different subset. In such an example, the asset data platform 102 may then maintain different sets of ranges of acceptable values for the load-test variables for each of various different capture circumstances (e.g., a first set of ranges for under-load reports captured during a first time of year, a second set of ranges for under-load reports captured during a second time of year, etc.). Other examples are possible as well.

Based on the representative historical value for each load-test variable, the asset data platform 102 may then define a range of acceptable values for each load-test variable. This function may take various forms. As one possibility, defining the range of acceptable values for a given load-test variable may involve defining a minimum acceptable value, a maximum acceptable value, or both based on the representative historical value for the given load-test variable. For example, the asset data platform 102 could determine a historical average for a given load-test variable (e.g., the historical mean, median, or mode) and then use that historical average to define a minimum acceptable value and/or maximum acceptable for the given load-test variable, such as by setting a minimum acceptable value to be a value that is a given number of standard deviations (e.g., one standard deviation) below the historical average and/or setting a maximum acceptable value to be a value that is a given number of standard deviations (e.g., one standard deviation) above than the historical average. Other examples are possible as well.

After the asset data platform 102 defines the ranges of acceptable values for the load-test variables, the asset data platform 102 may then store the ranges for future use in conducting virtual load tests. It should also be understood that the asset data platform 102 may periodically update the ranges of acceptable values for the load-test variables. For example, as the asset data platform 102 continues to receive under-load reports from the fleet of assets, the asset data platform 102 may compile an updated set of historical under-load reports and then eventually decide to re-run the training phase to update the ranges of acceptable values for the load-test variables based on the updated set of historical under-load reports.

Turning to block 604, after defining the ranges of acceptable values for the load-test variables, the asset data platform 102 may receive one or more under-load reports from a given asset (among other assets in the fleet). The asset data platform 102 may receive different types of under-load reports (e.g., user-triggered under-load report, asset-triggered under-load report) under various circumstances.

In one implementation, the asset data platform 102 may receive an asset-triggered under-load report from asset 106 via communication network 104 each time the asset 106 begins to operate under the given set of load conditions (e.g., a threshold speed of 20 MPH and full throttle). In another implementation, the asset data platform 102 may receive an asset-triggered under-load report from an asset (e.g. asset 106) via communication network 104 when the asset continues to operate under the given set of load conditions for a threshold amount of time. For instance, asset 106 may send a first asset-triggered under-load report when it first begins operating under the given set of load conditions, and then as the continues to operate under the given set of load conditions, the asset 106 may send periodic asset-triggered under-load reports (e.g., every 15 minutes).

In yet another implementation, the asset data platform 102 may receive, via communication network 104, a user-triggered under-load report from asset 106 in response to an operator activating one or more controls at the asset 106 (or at a remote location). For example, the operator may activate a mechanical control, which may cause the asset 106 to send the user-triggered under-load report to the asset data platform 102. In another example, an operator may activate a control in a software application running on the client station 112, which may cause the asset 106 to send the user-triggered under-load report to the asset data platform 102.

The asset data platform 102 may receive an under-load report (e.g., user-triggered under-load report, asset-triggered under-load report) from an asset in other circumstances as well.

At step 606, after having received one or more under-load reports from the given asset, the asset data platform 102 may then decide to initiate a virtual load test for the given asset. The asset data platform 102 may make this decision to initiate a virtual load test for the given asset in response to various triggering events. According to one implementation, the asset data platform 102 may provide a GUI through which a user may request to initiate a virtual load test for the given asset, which may be accessed by client stations that are communicatively coupled to the asset data platform 102 such as client station 112. In this respect, the asset data platform 102 may be configured to initiate the virtual load test for the given asset in response to a request that is triggered via the GUI (e.g., an HTTP request sent by client station 112). Such a request may include an identifier of the given asset. In addition, the request may also include other information about the given asset as well, such as asset age, asset location, etc. However, in other examples, the asset data platform 102 may use the identifier of the given asset to determine additional information about the given asset on the platform's end. The request received via the GUI may take other forms as well.

According to another implementation, the asset data platform 102 may initiate a virtual load test for a given asset in response to receiving a user-triggered under-load report (which may be sent to the asset data platform 102 before the given asset is released from a repair shop, as one example).

In yet another implementation, the asset data platform 102 may initiate the virtual load test for the given asset according to a predefined schedule, such as on a daily, weekly, monthly, or yearly basis for instance. In this respect, the GUI provided by the asset data platform 102 may enable a user to predefine a load testing schedule for the given asset. Additionally or alternatively, the asset data platform 102 may define a load testing schedule for the given asset in other manners as well.

According to yet another implementation, the asset data platform 102 may be configured to present a prompt via the GUI to ask a user whether a virtual load test for the given asset should be initiated. In turn, the asset data platform 102 may then initiate the virtual load test in response to the user's confirmation of this prompt. In this respect, the asset data platform 102 may present the prompt in response to various triggering events. As one possible example, the asset data platform 102 may present the prompt as a result of its analysis of operating data received from the given asset (e.g., based on the output of a predictive failure model).

The asset data platform 102 may make this decision to initiate a virtual load test for the given asset in response to other triggering events as well.

At block 608, in response to deciding to initiate the virtual load test for the given asset, the asset data platform 102 may access a most recent one or more under-load reports received from the given asset, each of which includes a recent snapshot of values for the set of load-test variables that were captured by the given asset while operating under the given set of load conditions. The values for the load-test variables included in the most recent under-load report received from the given asset may be referred to herein as "observation values." For instance, in one implementation, the asset data platform 102 may access only the last under-load report received from the given asset, in which case the snapshot values for the load-test variables included in the last-received under-load report are used as the given asset's observation values. In another implementation, the asset data platform 102 may access the last several under-load reports received from the given asset (e.g., the 5 most recent under-load reports received), in which case the asset data platform 102 may determine a representative value for each load-test variable based on the last several under-load reports (e.g., a mean or median of the values for each load-test variable over the last several under-load reports) and then use these representative values as the given asset's observation values. Other implementations are possible as well.

At block 610, in response to deciding to initiate the virtual load test for the given asset, the asset data platform 102 may also access a respective range of acceptable values for each load-test variable included in the given asset's one or more under-load reports, which are the ranges of acceptable values to be used for the given asset's virtual load test. This function of accessing the ranges of acceptable values for the given asset's virtual load test may vary depending on the implementation.

For instance, in one implementation, the asset data platform 102 may define and maintain a single set of ranges that apply to all assets in the field, in which case the asset data platform 102 may simply access and use that single set of ranges for the given asset's virtual load test. In another implementation, the asset data platform 102 may define and maintain multiple sets of ranges that correspond to different capture circumstances (e.g., different times of year, different locations, different weather conditions, different asset ages, etc.), in which case the asset data platform 102 may use the capture circumstances associated with the given asset's one or more under-load reports to select the particular set of ranges to access and use for the given asset's virtual load test. The function of accessing the ranges for the given asset's virtual load test may take other forms as well.

As part of the function of accessing the ranges of acceptable values for the given asset's virtual load test, the asset data platform 102 may also be configured to modify the respective ranges of acceptable values for the load-test variables (or at least a subset thereof) based on various factors, examples of which may include the particular time of year when the given asset's most recent one or more under-load reports were generated, the particular location at which the given asset's most recent one or more under-load reports were generated, the particular weather conditions at the location where the given asset's most recent one or more under-load reports were generated, and/or certain attributes of the given asset at the time that it generated the most recent one or more under-load reports (e.g., asset age, intended usage of the asset, etc.). As one illustrative example, if the given asset's age meets or exceeds a threshold age, the asset data platform 102 may be configured to expand (i.e., loosen) the respective ranges of acceptable values for the load-test variables (or at least a subset thereof) that are to be used for the given asset's virtual load test. Many other examples are possible as well.

In turn, at block 612, the asset data platform 102 may execute the virtual load test by comparing the given asset's observation values for the load-test variables to the accessed ranges of acceptable values for the load-test variables and thereby identifying any load-test variable for which the given asset's observation value falls outside of the range of acceptable values. The asset data platform 102 may perform this function in various manners.

According to one implementation, for each load-test variable, the asset data platform 102 may (1) compare the given asset's respective observation value for the load-test variable to the respective range of acceptable values for the load-test variable, (2) based on the comparison, determine whether the given asset's respective observation value falls outside of the respective range of acceptable values for the load-test variable, and (3) if so, flag the load-test variable as one for which the given asset's observation value falls outside of the range of acceptable values.

For instance, taking frequency of rotation (measured in RPM) as an example load-test variable, the asset data platform 102 may compare the given asset's observation value for the frequency of rotation to the range of acceptable values for the frequency of rotation. Based on the comparison, the asset data platform 102 may determine that the frequency of rotation of the given asset falls outside of the range of acceptable values for the frequency of rotation. In turn, the asset data platform 102 may flag frequency of rotation as a load-test variable for which the given asset's observation value falls outside of the range of acceptable values.

According to another implementation, the asset data platform 102 may flag a load-test variable based on a combination of load-test variables and their respective values. For example, taking battery voltage and battery current as a combination of load-test variables, the asset data platform 102 may compare the given asset's observation values for the battery voltage and the battery current to their respective range of acceptable values. Based on the comparison, the asset data platform 102 may determine that the respective observation values for the battery voltage and the battery current both fall outside of their respective range of acceptable values. In turn, the asset data platform 102 may flag both load-test variables.

As another example, taking battery voltage and battery current as a combination of load-test variables again, the asset data platform 102 may compare the given asset's observation values for the battery voltage and the battery current to their respective ranges of acceptable values. Based on the comparison, the asset data platform 102 may determine that the observation value for the battery voltage is just within its range of acceptable values, while the observation value for the battery current is far outside of its range of acceptable values. Even though the battery voltage was within its range of acceptable values, the asset data platform 102 may nevertheless flag both the battery voltage and battery current load-test variables after analyzing the combination of the two load-test variables.

The function of comparing the given asset's observation values for the load-test variables to the accessed ranges of acceptable values for the load-test variables may take other forms as well.

In addition to flagging load-test variables, the asset data platform 102 may provide one or more reasons why the given asset's observation value for a load-test variable was flagged. For instance, the asset data platform 102 may be configured to execute a predictive model that takes the compared results as its input (potentially along with other operating data for the given asset) and outputs a prediction of one or more reasons as to why the given asset's observation value falls outside of the range of acceptable values for at least one load-test variable. In one example, taking battery voltage and battery current as example load-test variables again, the asset data platform 102 may analyze the respective observation values and predict that that the observation values for the battery voltage and the battery current fall outside of their respective range of acceptable values due to a problem within the asset's battery component. Other examples are possible as well.

After comparing the given asset's observation values for the load-test variables to the accessed ranges of acceptable values for the load-test variables, the asset data platform 102 may then store the results of the virtual load test, so that the results may be presented at a given time.

At block 614, after storing the results of the given asset's virtual load test, the asset data platform 102 may cause a client station (e.g., client station 112) to present results of the virtual load test for the given asset. Presenting the results of the virtual load test may take various forms. In one implementation, in response to completing the virtual load test, the asset data platform 102 may send, via the communication network 104, the results of the virtual load test to the client station 112. In turn, the results of the virtual load test may be displayed via the GUI of the client station 112.

In another implementation, a user may subscribe to an alert that causes the asset data platform 102 to notify the user whenever results of the given asset's virtual load test are available. The asset data platform 102 may then send the alert to notify the user that the results are available. In turn, the user may cause the asset data platform 102 to present results of the virtual load test for the given asset via the client station 112 (e.g., by requesting that the results of the virtual load test be displayed by the client station 112).

Further, the results of the virtual load test may take various forms. As one possibility, the results of the virtual load test may include an indication of each load-test variable for which the given asset's observation value falls outside of the range of acceptable values. Such an indication may be presented to a user via the GUI in the form of text and/or graphics intended to notify the user that the given asset's observation value for the load-test variable falls outside of the range of acceptable values for the load-test variable.

As another possibility, the results of the virtual load test may include a representation of the given asset's observation values and/or the ranges of acceptable values for the set of load-test variables, or at least a subset thereof (e.g., the subset of load-test variables for which the given asset's observation values fall outside of the ranges of acceptable values). Such a representation may then be presented to a user via the GUI in the form of text and/or graphics intended to notify the user of the given asset's respective observation value and/or the respective range of acceptable values for each of the load-test variables.

As yet another possibility, the results of the virtual load test may include a prediction as to why the given asset's observation value falls outside of the range of acceptable values for at least one load-test variable. For example, as noted above, the asset data platform 102 may predict that that the observation values for battery voltage and battery current fall outside of the respective range of acceptable values due to a problem within the asset's battery component. Such a representation may then be presented to a user via the GUI in the form of text and/or graphics intended to deliver the prediction to the user.

As still another possibility, the results of the virtual load test may include the results of a trending analysis for the given asset's observation values for the load-test variables over a period of time, which may indicate how the given asset's observation values for each load-test variable (or at least a subset thereof) compare to other recent values for the load-test variable (e.g., whether the values are trending up or down). These trending analysis results may then be presented to a user via the GUI in the form of text and/or graphics (e.g., up or down arrows) intended to notify the user how the given asset's observation values are trending.

Additionally, the results of the virtual load test may include identifying information for the given asset, such asset identifier, asset type, asset age, and/or asset location, among other characteristics associated with the given asset.

FIG. 7 illustrates an example interface 700 of the GUI that displays the results of the virtual load test. As shown, the results of the virtual load test may include a description of each load-test variable in the "Description" column, observation values of each load-test variable in the "Value" column, and the range of acceptable values indicated by the values in the "High" and "Low" columns, among other examples. The interface 700 also includes one or more indications of each load-test variable for which the given asset's observation value falls outside of the range of acceptable values. For example, as shown in FIG. 7, "Signal F" and "Signal I" are presented in a different color than the other load-test variables. Additionally, "Signal F" and "Signal I" are presented with arrows indicating whether the observation value for these load-test variables fell above or below their respective range of acceptable values.

After presenting the results of the virtual load test for the given asset to a user via the GUI, the asset data platform 102 may also present the user with the option to accept or reject the virtual load test for the given asset. If the user chooses to accept the virtual load test, the asset data platform 102 may responsively store the results of the virtual load test as part of the "medical history" for the given asset. Alternatively, if the user chooses to reject the virtual load test, the asset data platform 102 may responsively discard the results of the virtual load test without storing those results.

Additionally, as shown in FIG. 7, the asset data platform 102 may present the user with the option to export the virtual load test for the given asset to, for example, share the results of the virtual load test with another user, among other examples.

Further, as another possibility, after completing the virtual load test, the asset data platform 102 may conduct some additional analysis to determine whether the asset (e.g., asset 106) is "cleared for release." This analysis may be based on the results of the virtual load test and/or additional data available to the asset data platform 102 (e.g., data indicating the physical configuration of the asset 106). As a result of this analysis, the asset data platform 102 may present an indication on whether the asset is cleared for release, which may ensure the user that the asset can safely operate in the field as intended under certain operating conditions.

In addition to presenting the results of the virtual load test, the GUI may also include one or more controls to modify the ranges of acceptable values for the load-test variables. Modifying the ranges of acceptable values for the load-test variable may cause the asset data platform 102 to present the results of the virtual load test in various forms. In one example, in response to modifying the ranges of acceptable values for the load-test variables, the asset data platform 102 may cause the GUI to present the results of the virtual load test relative to the modified ranges of acceptable values. In another example, in response to modifying the ranges of acceptable values for the load-test variables, the asset data platform 102 may cause the GUI to present the results of the virtual load test relative to the modified ranges of acceptable values, in addition to providing one or more indications as to how such results relate to the unmodified ranges of acceptable values. Other examples are possible as well.

VI. Conclusion

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

The invention claimed is:

1. A computing system comprising:
   at least one processor;
   a tangible, non-transitory computer-readable medium; and
   program instructions stored on the tangible, non-transitory computer-readable medium that are executable by the at least one processor to cause the computing system to:
      analyze historical under-load reports sent by a group of assets and thereby define a respective range of acceptable values for each load-test variable in a set of load-test variables included in the historical under-load reports;
      receive one or more under-load reports from a given asset;
      carry out a virtual load test for the given asset by:
         accessing a most recent under-load report received from the given asset, wherein the most recent under-load report comprises a respective observation value for each load-test variable in the set of load-test variables;
         accessing the respective range of acceptable values for each load-test variable in the set of load-test variables;
         for each load-test variable in the set of load-test variables, performing a comparison between the respective observation value for the load-test variable included in the most recent under-load report and the respective range of acceptable values for the load-test variable; and
         based on the comparisons, identifying any load-test variable in the set of load-test variables for which the respective observation value included in the most recent under-load report falls outside of the respective range of acceptable values; and
      after carrying out the virtual load test for the given asset, cause a client station to present results of the virtual load test for the given asset, wherein the results comprise an indication of each identified load-test variable for which the respective observation value in the most recent under-load report falls outside of the respective range of acceptable values.

2. The computing system of claim 1, wherein the set of load-test variables comprise one or more diagnostic variables and one or more in-motion variables.

3. The computing system of claim 1, wherein the historical under-load reports sent by the group of assets comprise operating data reports that were previously sent by assets in the group of assets while under a given set of load conditions.

4. The computing system of claim 1, wherein each historical under-load report comprises a respective historical value for each load-test variable in the set of load-test variables, and wherein the program instructions that are executable by the at least one processor to cause the computing system to analyze the historical under-load reports and thereby define a respective range of acceptable values for each load-test variable in the set of load-test variables comprise program instructions stored on the tangible, non-transitory computer-readable medium that are executable by the at least one processor to cause the computing system to:
   for each load-test variable in the set of load-test variables, evaluate the historical values included in the historical load-test reports to determine a representative historical value for the load-test variable and then define a range of acceptable values for the load-test variable based on the representative historical value.

5. The computing system of claim 1, wherein the respective range of acceptable values for each load-test variable in the set of load-test variables comprises one or both of a minimum acceptable value and a maximum acceptable value for each load-test variable in the set of load-test variables.

6. The computing system of claim 1, wherein the program instructions that are executable by the at least one processor to cause the computing system to carry out a virtual load test for the given asset comprise program instructions stored on the tangible, non-transitory computer-readable medium that are executable by the at least one processor to cause the computing system to:
   carry out the virtual load test for the given asset in response to receiving a request triggered via a graphical user interface (GUI) being displayed on the client station.

7. The computing system of claim 1, wherein the program instructions that are executable by the at least one processor to cause the computing system to carry out a virtual load test for the given asset comprise program instructions stored on the tangible, non-transitory computer-readable medium that are executable by the at least one processor to cause the computing system to:
   carry out the virtual load test for the given asset in response to receiving a user-triggered under-load report, wherein the user-triggered under-load report is received in response to operator input.

8. The computing system of claim 1, wherein the program instructions that are executable by the at least one processor to cause the computing system to carry out a virtual load test for the given asset comprise program instructions stored on the tangible, non-transitory computer-readable medium that are executable by the at least one processor to cause the computing system to:
   carry out the virtual load test for the given asset in accordance with a predefined schedule.

9. The computing system of claim 1, wherein the program instructions that are executable by the at least one processor further causes the computing system to:
   store the results of the virtual load test after carrying out the virtual load test for the given asset.

10. The computing system of claim 1, wherein the program instructions that are executable by the at least one processor to cause the computing system to cause a client station to present results of the virtual load test for the given asset comprise program instructions stored on the tangible, non-transitory computer-readable medium that are executable by the at least one processor to cause the computing system to:
   send the results of the virtual load test to the client station; and cause the client station to display the results of the of the virtual load test via a graphical user interface (GUI).

11. The computing system of claim 10, wherein sending the results of the virtual load test to the client station comprises sending the results of the virtual load test in response to a user request via the GUI.

12. The computing system of claim 1, wherein the program instructions that are executable by the at least one processor further causes the computing system to:
send an alert to notify that the results of the virtual load test are available after carrying out the virtual load test for the given asset.

13. The computing system of claim 1, wherein the results of the virtual load test further comprise a representation of the respective observation value for each load-test variable in the set of load-test variables and a representation of the respective range of acceptable values for each load-test variable in the set of load-test variables.

14. The computing system of claim 1, wherein the results of the virtual load test further comprise, for at least one identified load-test variable, a prediction as to why the respective observation value in the most recent under-load report falls outside of the respective range of acceptable values.

15. The computing system of claim 1, wherein the results of the virtual load test further comprise the results of a trending analysis for each load-test variable in the set of load-test variables.

16. A non-transitory computer-readable medium having instructions stored thereon that are executable to cause a computing system to:
analyze historical under-load reports sent by a group of assets and thereby define a respective range of acceptable values for each load-test variable in a set of load-test variables included in the historical under-load reports;
receive one or more under-load reports from a given asset;
carry out a virtual load test for the given asset by:
accessing a most recent under-load report received from the given asset, wherein the most recent under-load report comprises a respective observation value for each load-test variable in the set of load-test variables;
accessing the respective range of acceptable values for each load-test variable in the set of load-test variables;
for each load-test variable in the set of load-test variables, performing a comparison between the respective observation value for the load-test variable included in the most recent under-load report and the respective range of acceptable values for the load-test variable; and
based on the comparisons, identifying any load-test variable in the set of load-test variables for which the respective observation value included in the most recent under-load report falls outside of the respective range of acceptable values; and
after carrying out the virtual load test for the given asset, cause a client station to present results of the virtual load test for the given asset, wherein the results comprise an indication of each identified load-test variable for which the respective observation value in the most recent under-load report falls outside of the respective range of acceptable values.

17. The non-transitory computer-readable medium of claim 16, wherein carrying out the virtual load test for the given asset comprises carrying out the virtual load test for the given asset in response to receiving a request triggered via a graphical user interface (GUI) being displayed on the client station.

18. The non-transitory computer-readable medium of claim 16, wherein carrying out the virtual load test for the given asset comprises carrying out the virtual load test for the given asset in response to receiving a user-triggered under-load report, wherein the user-triggered under-load report is received in response to operator input.

19. A method comprising:
analyzing, via a computing system, historical under-load reports sent by a group of assets and thereby defining a respective range of acceptable values for each load-test variable in a set of load-test variables included in the historical under-load reports;
receiving, via the computing system, one or more under-load reports from a given asset;
carrying out, via the computing system, a virtual load test for the given asset by:
accessing a most recent under-load report received from the given asset, wherein the most recent under-load report comprises a respective observation value for each load-test variable in the set of load-test variables;
accessing the respective range of acceptable values for each load-test variable in the set of load-test variables;
for each load-test variable in the set of load-test variables, performing a comparison between the respective observation value for the load-test variable included in the most recent under-load report and the respective range of acceptable values for the load-test variable; and
based on the comparisons, identifying any load-test variable in the set of load-test variables for which the respective observation value included in the most recent under-load report falls outside of the respective range of acceptable values; and
after carrying out the virtual load test for the given asset, causing, via the computing system, a client station to present results of the virtual load test for the given asset, wherein the results comprise an indication of each identified load-test variable for which the respective observation value in the most recent under-load report falls outside of the respective range of acceptable values.

20. The method of claim 19, wherein carrying out the virtual load test for the given asset comprises carrying out the virtual load test for the given asset in response to receiving, via the computing system, a request triggered via a graphical user interface (GUI) being displayed on the client station.

* * * * *